United States Patent [19]
Ijuin et al.

[11] Patent Number: 5,661,571
[45] Date of Patent: Aug. 26, 1997

[54] IMAGE READING DEVICE

[75] Inventors: Kazuya Ijuin, Tokyo; Hiroo Ichihashi, Chigasaki; Katsumi Komiyama, Isehara; Yoshikazu Sano, Kawasaki; Makoto Ogura; Osamu Hamamoto, both of Isehara; Tetsuya Shimada, Zama, all of Japan

[73] Assignee: Canon Kabushiki Kaisha, Tokyo, Japan

[21] Appl. No.: 291,749

[22] Filed: Aug. 17, 1994

Related U.S. Application Data

[63] Continuation of Ser. No. 188,106, Oct. 28, 1994, abandoned, which is a continuation of Ser. No. 772,662, Oct. 7, 1991, abandoned.

[30] Foreign Application Priority Data

| Oct. 11, 1990 | [JP] | Japan | 2-270483 |
| Nov. 14, 1990 | [JP] | Japan | 2-309487 |
| Feb. 15, 1991 | [JP] | Japan | 3-022073 |

[51] Int. Cl.$^6$ .................................. H04N 1/04
[52] U.S. Cl. .................................. 358/471; 358/498
[58] Field of Search .................................. 358/471, 492, 358/498, 494, 473–474

[56] References Cited

U.S. PATENT DOCUMENTS

| 4,729,036 | 3/1988 | Ikeda et al. | 358/498 |
| 4,754,337 | 6/1988 | Nohtomi et al. | 358/471 |
| 4,768,100 | 8/1988 | Kunishima et al. | 358/285 |
| 4,812,917 | 3/1989 | Suzuki | 358/293 |
| 4,839,741 | 6/1989 | Wilson | 358/474 |
| 4,939,541 | 7/1990 | Sugiura | 355/202 |
| 5,013,322 | 5/1991 | Beck et al. | 358/498 |
| 5,065,250 | 11/1991 | Takanashi et al. | 358/471 |
| 5,107,350 | 4/1992 | Omori | 358/498 |
| 5,337,165 | 8/1994 | Riousset et al. | 358/498 |

FOREIGN PATENT DOCUMENTS

| 0066625 | 12/1982 | European Pat. Off. . |
| 0280210 | 8/1988 | European Pat. Off. . |
| 2589021 | 4/1987 | France . |
| 3422867 | 1/1985 | Germany . |
| 57-154264 | 9/1982 | Japan . |
| 58-138167 | 8/1983 | Japan . |
| 63-107362 | 5/1988 | Japan . |
| 63-117552 | 5/1988 | Japan . |
| 1305656 | 12/1989 | Japan . |

*Primary Examiner*—Stephen Brinich
*Attorney, Agent, or Firm*—Fitzpatrick, Cella, Harper & Scinto

[57] ABSTRACT

An image reading device for reading image information of an original with reading means, includes: original pressing means including a flexible sheet, a flexible member for pressing the flexible sheet, and means for pressing the flexible member.

98 Claims, 17 Drawing Sheets

IMAGE READING DEVICE

This application is a continuation of application Ser. No. 08/188,106 filed Jan. 28, 1994, now abandoned, which is a continuation of application Ser. No. 07/772,662 filed Oct. 7, 1991, abandoned.

BACKGROUND OF THE INVENTION

1. Field of the Invention

The present invention relates to an image reading device, and more particularly to an original image reading device for optically reading image information from an original document and adapted for use in an image information processing apparatus such as a facsimile apparatus, an image scanner or the like.

2. Related Background Art

Requirements for smaller dimensions, lower weight and lower cost have become stronger in recent years in the field of image information processing apparatuses, such as facsimile apparatus, image scanners and the like. For facsimile apparatuses in particular, there have emerged various requirements for design and function, in addition to the above-mentioned ones, following the expansion of the market including so-called home facsimiles for personal use.

For the original image reading device to be incorporated in such image information processing apparatus for optically reading the image information of the original document, there have been employed a reduction reading system utilizing a line sensor such as a CCD and a reduction optical system; a contact reading system utilizing a line sensor of a length equal to the width of the original, an equal-magnification optical system such as a condensing fiber lens array, and a light source such as an LED array, all integrally assembled in a frame; and a complete contact reading system utilizing a line sensor and a light source integrally assembled in a frame, without the lens array, wherein the line sensor is maintained close to the original for directly reading the original image.

An example of such image reading device is schematically illustrated in FIGS. 1 and 2 which are respectively a cross-sectional view and a schematic perspective view.

There are shown a line sensor 101 for optically reading the image of an original P; an automatic sheet feeding unit 113 consisting of a separating member 111 and a sheet feeding roller 112, for separating and feeding the originals P one by one toward said line sensor 101; and a transport (pressure) roller 102 serving as original contacting means for contacting the fed original P to a reading position 104 of the line sensor 101 and also as original transport means for transporting said original P.

In such an image reading device, a transport (pressure) roller is provided opposite to the reading part of the contact sensor thereby maintaining the original in close contact with the reading line of said contact sensor, in order to prevent image blur at image reading, resulting from eventual lifting of the original from or movement thereof on the reading line of the line sensor.

Said transport (pressure) roller, for maintaining the original in close contact with the reading line of the reading part of the contact sensor, is generally made of a rubber material, in order to attain close contact of the original regardless of certain surface irregularities of said reading part.

Also the surface of said transport (pressure) roller is usually read by the reading part, prior to the reading of the image information of the original, for determining a reference color for image information reading of the original, and, for this purpose, said surface is usually white.

Thus a white rubber roller is generally employed for the transport (pressure) roller mentioned above.

However, the functions of original transport means and original contacting means, if performed by a transport roller in the image reading device, may result in following drawbacks:

(1) In order to maintain the original in close contact with the line sensor for reading the original image by said line sensor, the transport roller has to be as long as the line sensor or the reading width of the original. Therefore the local unevenness in the transporting power results from the planarity of the reading face of the line sensor, eventually causing skewed advancement of the original;

(2) The transportation of the original in contact with the reading face of the line sensor increases the load on a motor for driving the transport roller, thus eventually leading to heat generation or control abnormality in said motor. Therefore, for achieving stable transportation of the original, there is required a large motor, which becomes an obstacle to achieving the goals of cost reduction, compactness and weight reduction of the device;

(3) An original eventually fed in skewed state tends to become more skewed in the course of transportation, as will be explained in the following with reference to FIGS. 3A to 3C.

FIGS. 3A to 3C are schematic plan views of the image reading device shown in FIGS. 1 and 2, wherein the line sensor is not illuminated but is positioned behind the transport roller 102.

When an original P is fed in a skewed state in the automatic sheet feeding unit 113 as shown in FIG. 3A, it is advanced to the transport roller 102, as shown in FIG. 3B, by the transporting force (a) of the automatic sheet feeding unit 113, indicated by an arrow. Then, as a part of the original P is pinched between the transport roller 102 and the line sensor as shown in FIG. 3C, said part is subjected to a transporting force (b) of the transport roller 102, indicated by an arrow. In general, the peripheral speed of the feed roller (not shown in the Figure) of the automatic sheet feeding unit 113 is selected somewhat smaller than that of the transport roller 102. Consequently a load (c) indicated by an arrow is generated in a direction opposite to the transport direction of the original, due to said different in peripheral speed and a load induced by the frictional member, and a rotating force (d), also indicated by an arrow, is generated by the aforementioned transporting force (b) and the load (c), thus causing an increased skew in the original P.

On the other hand, if a pressure roller separate from the transport roller is required, there are required a space above the reading part for positioning said pressure roller and a space for accommodating a drive system, such as gears, for driving said pressure roller in the same driving direction as that of the transport roller, so that the total height of the device inevitably increases.

Also if a pressure roller of a smaller diameter is employed for reducing the total height of the device, the pressure roller shows more bending so that the assembling precision of the reading part and the pressure roller has to be improved in order to securely guide the light, emitted from the light source of said reading part and reflected by the roller surface, to a photoelectric converting device in the reading part. For this reason there will result an increase in the manufacturing cost and a loss in productivity.

Furthermore the pressure roller is required to have a small friction coefficient with the glass of the reading part but a large friction coefficient with the original for ensuring secure transportation, and it is difficult to select a material satisfying such requirements.

As explained in the foregoing, there are still left various technical problems, in order to satisfy the ever increasing requirements for smaller dimension, lower weight and lower cost of the image reading device.

SUMMARY OF THE INVENTION

In consideration of the foregoing, an object of the present invention is to provide a compact, light-weight and inexpensive image reading device, adapted for use in various image information processing apparatus such as a facsimile apparatus, an image sensor, a computer, a word processor, a copying machine or the like.

A further object of the present invention is to provide an original image reading device capable of reading the original image with a simple construction without transporting the original in an erroneous oblique direction.

A still further object of the present invention is to provide easily handling of an original by an image reading device even if it includes a contact type image sensor which makes positioning and original transporting difficult.

A still further object of the present invention is to provide an original image reading device which can be removably combined together with an information processing apparatus easily.

Another object of the present invention is to provide an image reading device capable of reducing the total height of the device, not requiring a high precision of assembly for guiding the reflected light to the reading part, and enabling easy selection of material for the pressurizing means.

Still another object of the present invention is to provide an image reading device capable of resolving skewed advancement, without the elevated cost and increased dimension for example, the motor, thereby achieving reductions in dimension, weight and cost as desired in recent years.

Still another object of the present invention is to provide an image reading device, capable of improving the precision of assembly of components relating to original reading, by integrally positioning a frame and employing a unit structure.

Still another object of the present invention is to provide an image reading device capable of significantly reducing the work required for designing, evaluation and production by standardizing the unit so as to be adaptable for various models of image information processing apparatuses, thereby enabling total cost reduction thereof.

Still another object of the present invention is to provide an image reading device formed as a compact and light-weight unit, thereby facilitating the layout in the image information processing apparatus and increasing the freedom in designing thereof.

Still another object of the present invention is to provide an image reading device which is easily replaceable by the operator without particular training, skills or tool, whereby the defect or malfunction of the image reading device in the image information processing apparatus can be easily repaired.

DETAILED DESCRIPTION OF THE PREFERRED EMBODIMENTS

The foregoing objects can be attained, according to a preferred embodiment of the present invention, by an image reading device comprising original pressing means including a flexible sheet, a flexible member for pressing said flexible sheet, and means for pressing said flexible member, thereby maintaining the original in close contact with reading means.

Thus, in the present invention, the pressing means for pressing the original is composed of a flexible sheet which is a flatter structure, whereby the total height of the device can be reduced.

Also in reading,the surface of the pressing means by the reading means, since said surface is flat, there is not required a high precision of assembly, for guiding the light reflected from the surface of the pressing means to the reading means, in comparison with the case of employing a white rubber roller of a small diameter as the pressing means.

Furthermore, since the pressing means lacks the transporting function, the friction coefficient to the original or the reading means need not be considered, different from the case of white roller serving as the pressing and transporting means. For this reason the material selection for the pressing means can be facilitated.

The flexible sheet can be composed of an organic resinous film such as a polyester film, while the flexible member for pressing said flexible sheet can be composed for example of rubber sponge, and the means for pressing said flexible member can be composed for example of a weight exerting a pressure by the weight thereof, or a spring.

Also the foregoing objects can be attained, according to another embodiment of the present invention, by an image reading device for reading image information by maintaining an original in contact or substantial contact with reading means such as a line sensor, illuminating said original with a light source and entering the light reflected from said original into said line sensor, wherein the reading part of the line sensor is positioned outside of the nip of an original transport roller and in the original feeding side of said nip, and original contacting means is provided at said reading part, whereby reductions in dimension, weight and cost can be realized.

[Embodiment 1]

In the following there will be explained, with reference to attached drawings, an embodiment in which the image reading device of the present invention is applied to a facsimile apparatus.

Figure 1:
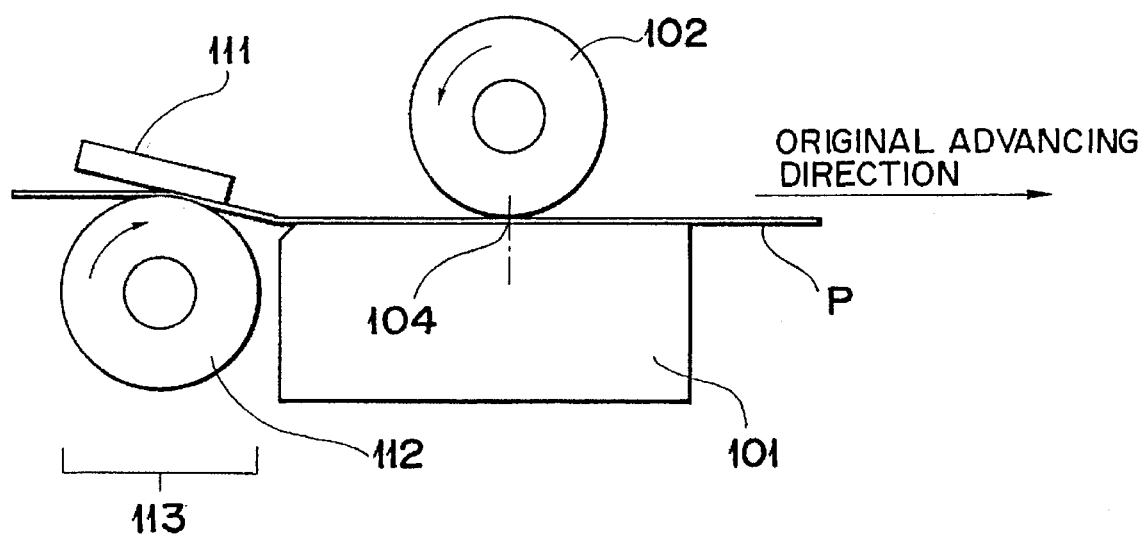
FIG. 1 is a schematic cross-sectional view of an original image reading device.
Figure 2:
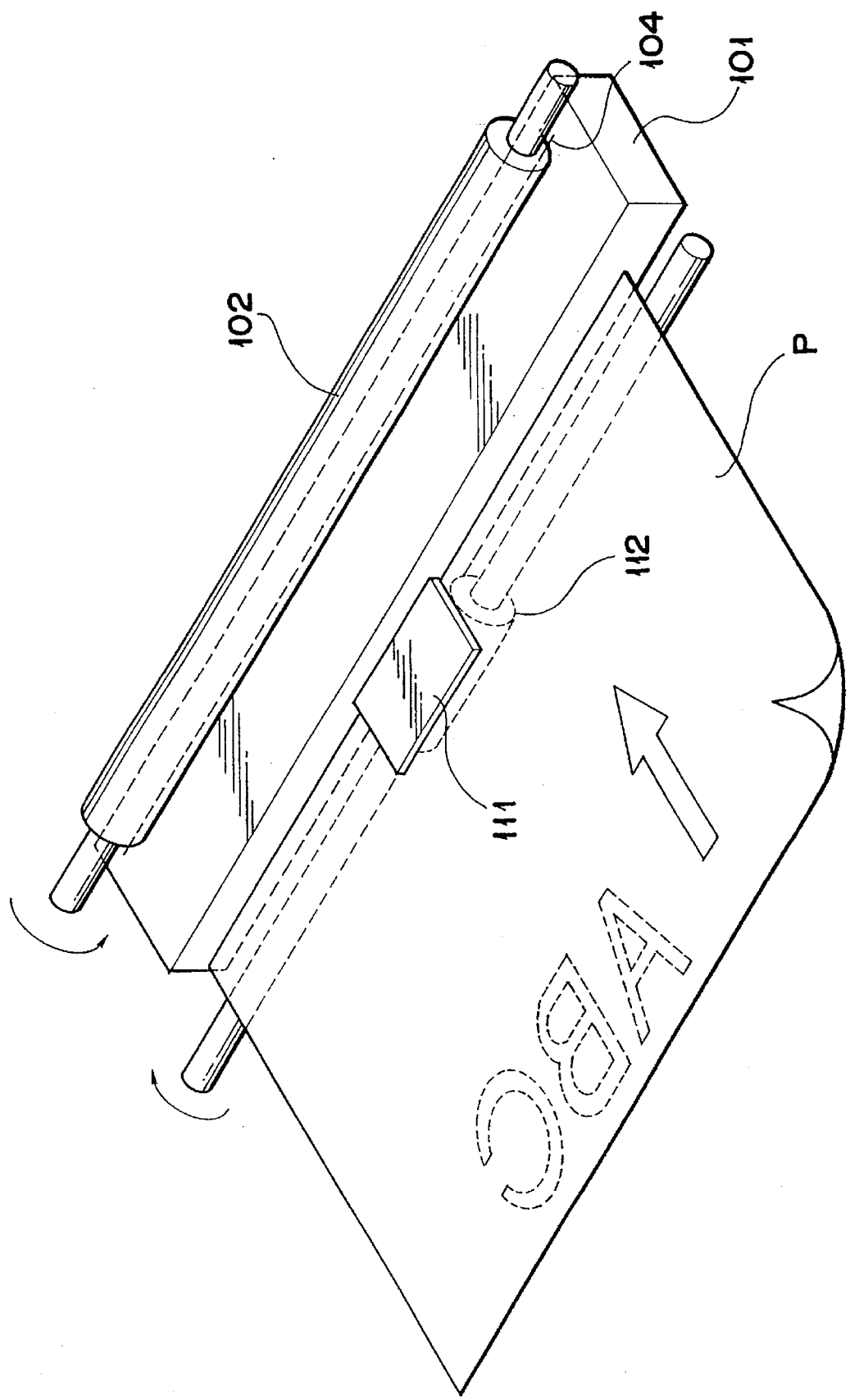
FIG. 2 is a schematic perspective view of an original image reading device.
Figure 3A:
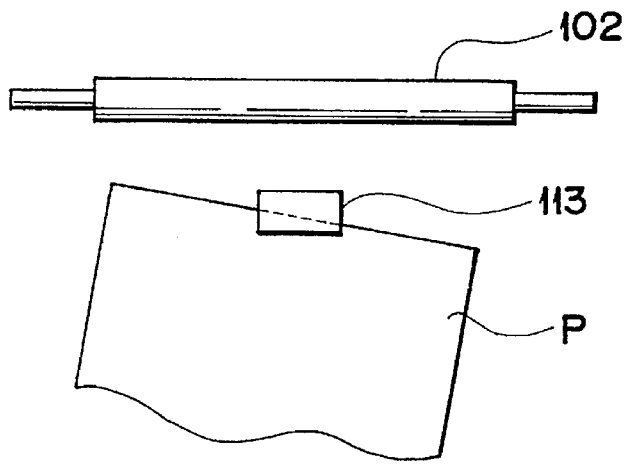
FIGS. 3A to 3C are views showing the state of transportation of an original in the original image reading device.
Figure 3B:
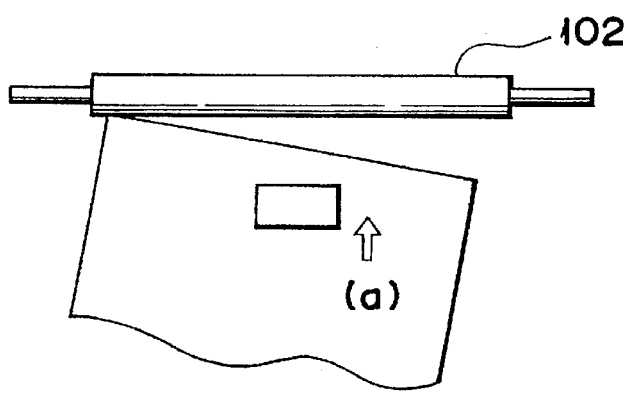
Figure 3C:
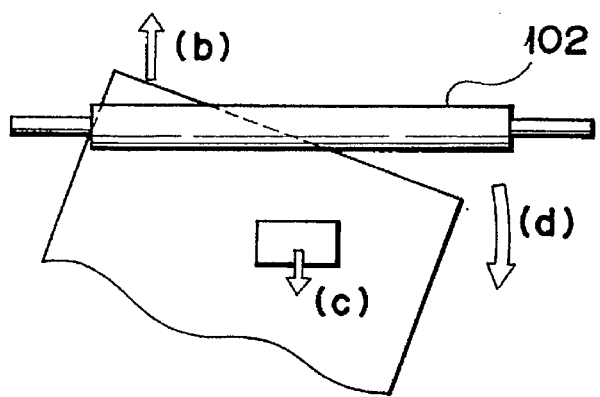
Figure 4:
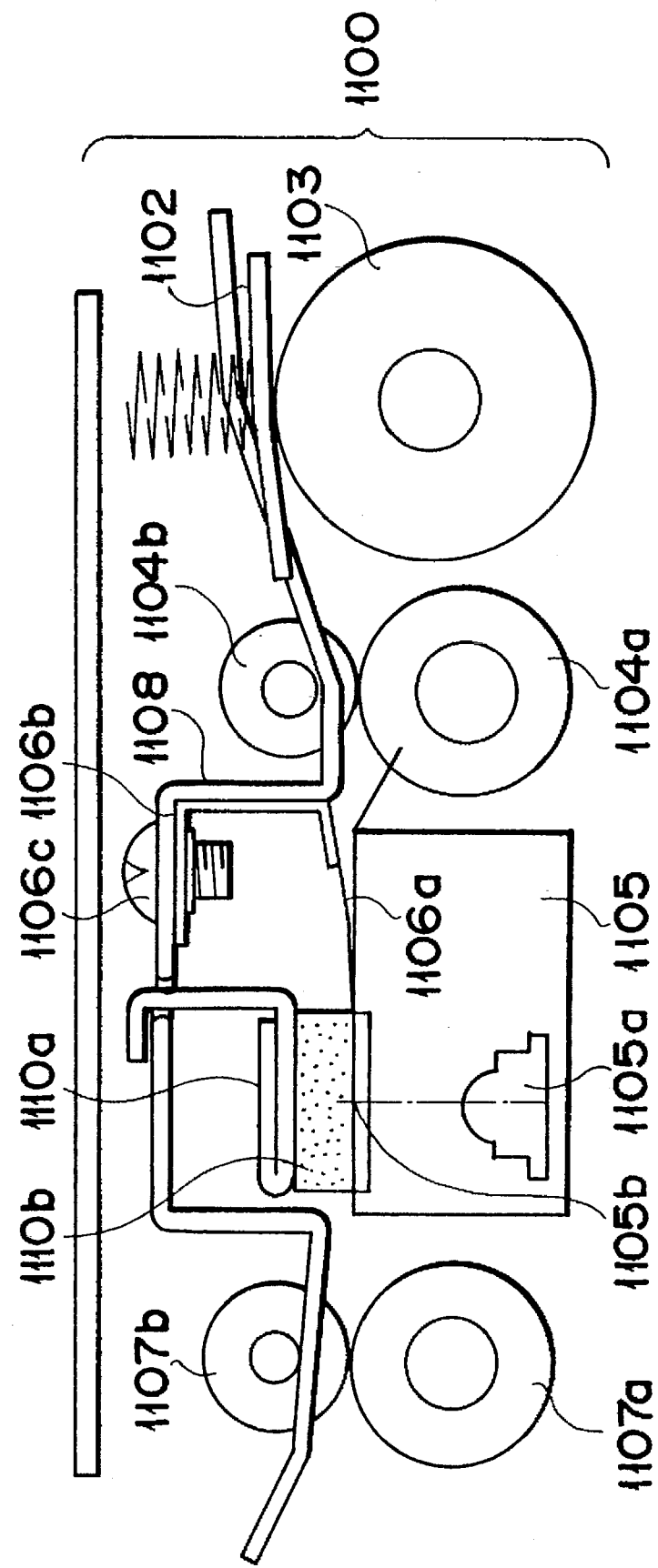
FIG. 4 is a cross-sectional view of an optical reading system in a facsimile apparatus embodying the present invention.
Figure 5:
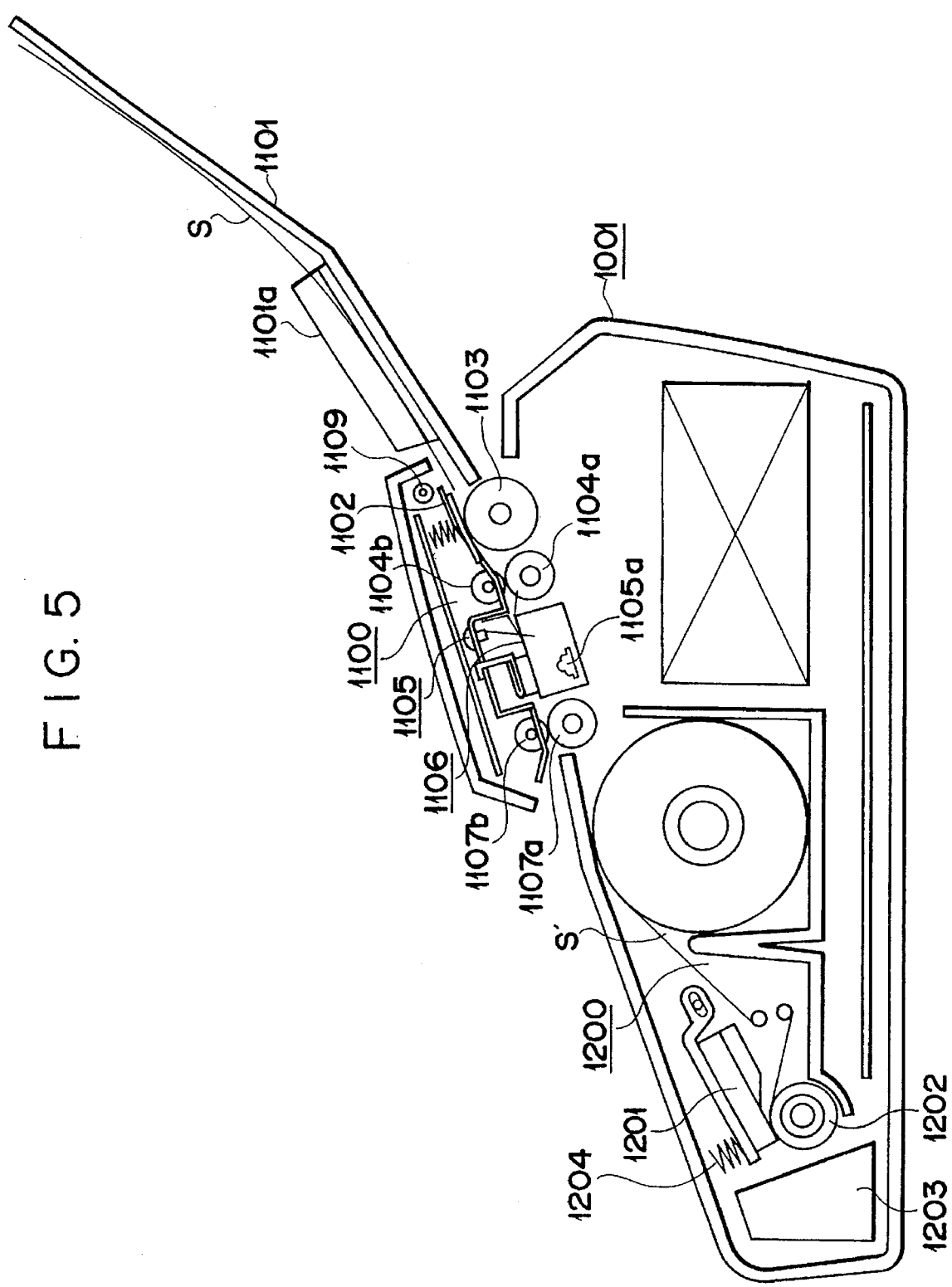
FIG. 5 is a magnified cross-sectional view of the optical reading system shown in FIG. 4.

FIG. 4 is a cross-sectional view of the entire facsimile apparatus, and FIG. 5 is a magnified cross-sectional view of the optical reading system of said facsimile apparatus.

Referring to FIGS. 4 and 5, an original tray 1101, extending diagonally from a main body 1001 in the upper right direction, can support a stack of plural originals S. On the upper face of the main body 1001, there is provided an optical reading system 1100 for reading the image information of the original S transported from said original tray 1101. In the lower left portion of the main body 1001 there is provided a recording system 1200 including a thermal head 1201 constituting recording means and a cutter 1203. On the upper face of the optical reading system 1100, there is provided an unrepresented operation panel. The optical reading system 1100 is so constructed as to separate the originals S stacked on the original tray 1101 one by one, by means of a separating member 1102 and a separating roller 1103 maintained in pressure contact therewith, to transport the original by a feeding roller 1104a maintained in contact with an idler roller 1104b to the image reading position of a contact image sensor 1105, to read the image information of said original S by pressing said original S to said contact image sensor by pressing means 1106, and to thereafter discharge the original S onto a record cover by a discharge roller 1107a maintained in contact with a discharge idler roller 1107b.

In said contact image sensor 1105, LED's 1105a constituting the light source illuminate the information-bearing surface of the original S, and a photoelectric converting device 1105b, having a light-receiving portion on an original transporting surface side of the contact image sensor 1105, receives the light reflected by said information-bearing surface, thereby reading the image information in the form of an electrical signal. The obtained information is transmitted, in the facsimile mode, to the recording unit of another apparatus, or, in the copy mode, to the recording unit of this apparatus. An upper unit including an upper original guide member 1108 for guiding the upper face of the original S can be opened by rotation about a shaft 1109, thereby facilitating the removal of a jammed original or the maintenance of the contact image sensor or an ADF (automatic document feeder).

On the original tray 1101, there is provided a slider 1101a slidable in a direction perpendicular to the transport direction of the original S, namely in the transversal direction of the original S, for aligning the lateral edges of the originals S stacked on said tray 1101.

In said recording system 1200, the thermal head 1201 is driven by the image signal from said contact image sensor 1105 or transmitted from the outside, whereby unrepresented heat generating elements of said thermal head 1201 generate heat corresponding to said image signal. Said thermal head 1201 is pressed by a spring 1204 from behind, toward a recording sheet S'. The platen roller 1202 is rotated in synchronization with the image signal, whereby image information is recorded in a predetermined position on said recording sheet S'. Upon completion of recording by the thermal head 1201, the recording sheet S' is advanced by a desired amount by the platen roller 1202, and is cut by the cutter 1203. After cutting, the recording sheet S' is reversed by the platen roller 1202 again until the front end of the recording sheet comes close to the recording position of the thermal head 1201, and the recording operation is thus completed.

In the facsimile mode, the image recording is conducted with the image signal transmitted from another facsimile apparatus, instead of the image signal from the contact image sensor 1105 of this apparatus.

In the following there will be given a detailed explanation on the optical reading system 1100, with reference to a magnified cross-sectional view in FIG. 5.

The pressing means 1106 is composed of a flexible sheet 1106a serving as the original contacting member, and a metal member 1106b having a square-U shaped section at an end, and is fixed by a screw 1106c onto the upper original guide member 1108.

The flexible sheet 1106a is composed of a flexible film-like or plate-shaped member such as a polyester film, and presses the original S onto the reading line (photoelectric converting elements) 1105b of the contact image sensor 1105.

The surface of said flexible sheet 1106a is preferably white, as it is read by the contact image sensor 1105 to provide reference color data in reading the image information of the original S, and it also provides the background color in case of reading a narrow original or a transparent original.

The rear face of the flexible sheet 1106a is adhered, in an area corresponding to the reading position, to a weight 1110a across rubber sponge 1110b. Said weight 1110a is formed by a bent metal plate, of which an end engages vertically movably with the upper original guide member 1108.

The weight 1110a and the rubber sponge 1110b are so sized to apply a pressure over a width of 10 mm, with the image reading position at the center. Said flexible sheet 1106a somewhat protrudes in convex form at a central portion facing said reading line 1105b, whereby the weight 1110a, rendered vertically movable in the inner side at the center of said upper original guide member 1108 and positioned parallel to the reading line 1105b, can effectively act on the central portion. In the present embodiment, the weight 1110a is selected as about 40 grams.

The rubber sponge 1110b, positioned between the weight 1110a and the flexible sheet 1106a, is preferably of such a hardness as to show deformation of 0.5–1 mm under the application of above-mentioned weight over the entire surface.

When the contact image sensor 1105 lacks the short-focus lenses as in the present embodiment, the depth of focus is limited to about 50 μm. If the planarity of the reading line 1105b of the contact image sensor involves a fluctuation of ±150 μm, it is practically difficult to realize satisfactory contact by the rigid weight only. However, the presence of the rubber sponge 1110b, showing flexibility in the pressing direction, between the rigid weight 1110a and the flexible sheet 1106a realizes satisfactory contact of the original without lifting thereof, even on a contact image sensor of poor surface flatness, due to the multiplication effect of the weight 1110a and the elasticity of the flexible sheet 1106a. Thus, on the reading line 1105b, the image-bearing surface of the original S is illuminated by the light from the LED's 1105a, and the light reflected from the image-bearing surface is introduced into the photoelectric converting elements 1105b to achieve reading of the image information of the original S.

In this manner the flexible sheet 1106a, replacing the pressure roller (white rubber roller), allows the original S to be maintained in contact with the reading line 1105b with a lower weight than that of said pressure roller, and the pressing means 1106 to be realized in a flatter configuration, thereby reducing the total height of the entire device.

Also, in reading the surface of the flexible sheet 1106a for the purpose of obtaining reference color data for the image information reading from the original S, there is not required a high precision of assembly for guiding the light, reflected on the flexible sheet 1106a, to the photoelectric converting elements 1105b of the contact image sensor, since the curvature is not so strong as in the pressure roller of a small diameter.

Furthermore, the presence of the rubber sponge 1110b between the weight 1110a and the flexible sheet 1106a allows secure pressing of the image-bearing surface of the original against the reading position 1105b of the contact image sensor 1105 even if the sensor lacks short-focus lenses and therefore has a limited depth of focus and if the flatness of the reading position 1105b is poor.

Also as the pressing means 1106 does not serve to transport the original S, the material selection for the flexible sheet 1106a is easier and has larger freedom, in comparison with the case in which the transport roller also serves as the pressure roller.

In the foregoing description, a thermal head is adopted as recording means of the recording system 1200, but other recording systems such as ink jet recording or electrostatic recording are naturally usable likewise.

Among the ink jet recording systems, a method of discharging ink by generating a bubble in the ink is particularly suitable for compactization and weight reduction of the ink jet recording head or the recording unit, thus being effective in achieving reductions in dimension and weight according to the present invention.

The present embodiment has been described by an application to the facsimile, but it is naturally applicable also to a copying machine or other image reading apparatus.

Also in the present embodiment, the weight 1110a, rubber sponge 1110b and flexible sheet 1106a are mutually adhered, but a similar effect can be obtained by combining these components in mutually separate state.

[Embodiment 2]

In the following there will be explained another embodiment of the present embodiment with reference to the attached drawings.

Figure 6:
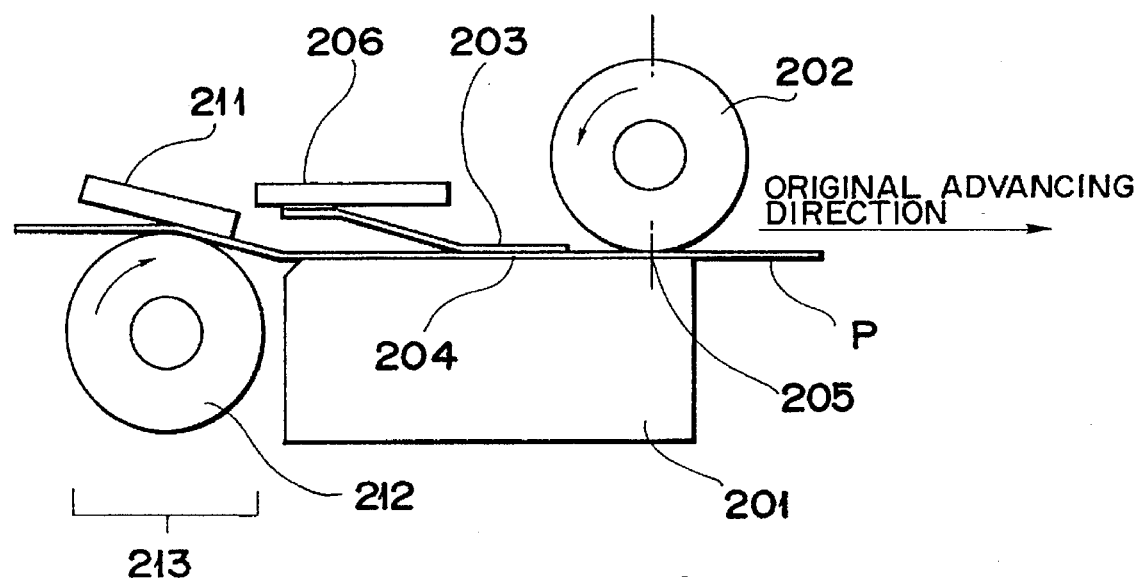
FIGS. 6, 8A to 8C, 9, 10 and 13 are respectively schematic cross-sectional views explaining embodiments of the original image reading device of the present invention.
Figure 7:
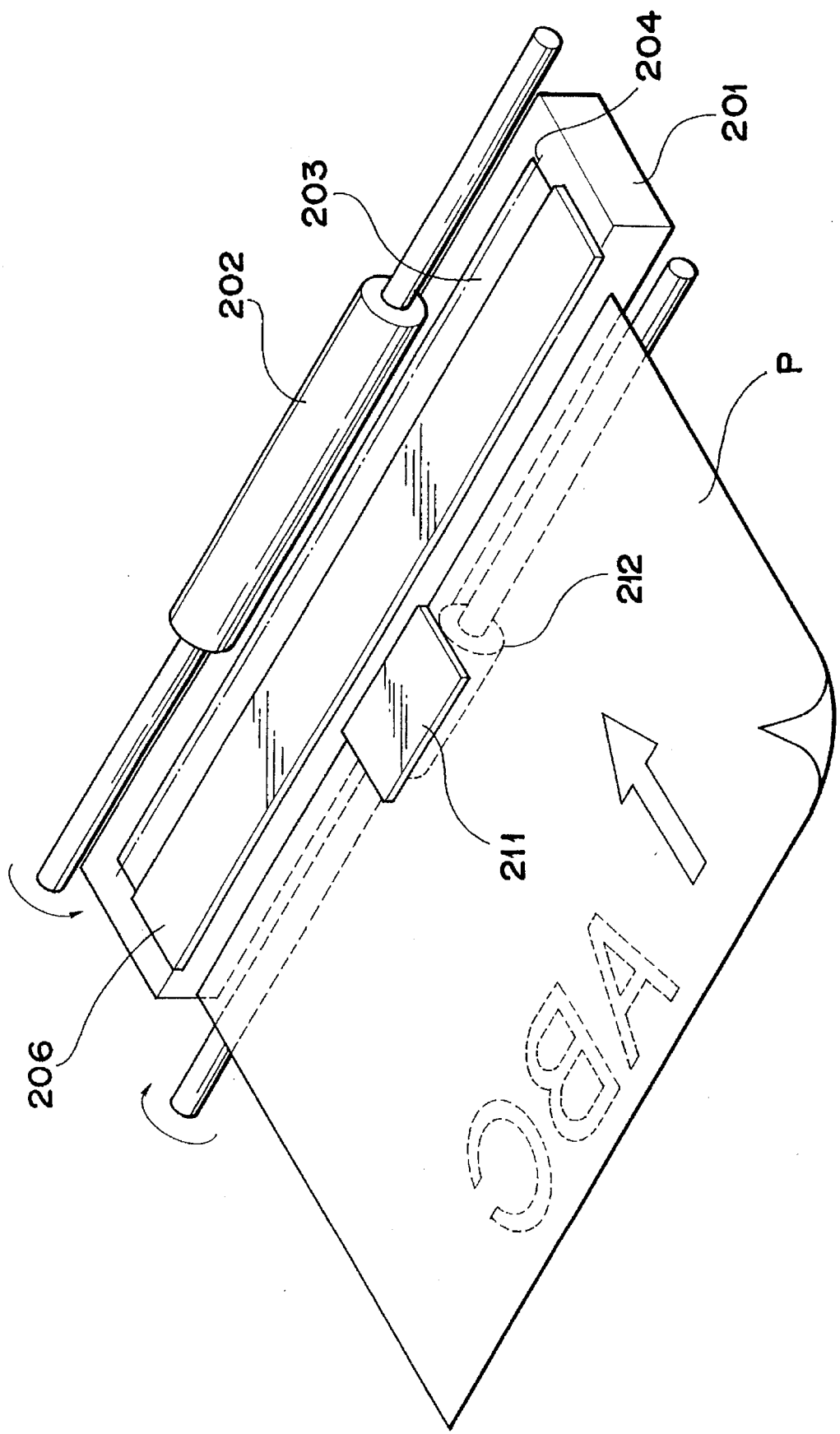
FIGS. 7, 12, 14, 15 and 16 are schematic perspective views explaining respectively the embodiments.

FIG. 6 is a schematic cross-sectional view of a 2nd embodiment of the image reading device of the present invention, and FIG. 7 is a schematic perspective view thereof.

Referring to FIGS. 6 and 7, there are shown a line sensor 201 for reading the image of an original P; a transport roller 202 for transporting the original P; an original contacting member 203 for contacting the original P with position 204 position 204 of the line sensor 201; and an automatic sheet feeding unit 213 consisting of a combination of a separating member 211 and a feed roller 212. Said original contacting member 203 is positioned out of the contact point 205 between the line sensor 201 and the transport roller 202 in the side of the original feeding unit 213, and outside the nip of the transport roller 202. The distance, on the line sensor 1, between the original contacting member 203 and the transport roller 202 is so determined that the original contacting member 203 at the reading position 204 and the transport roller 202 do not mutually interfere. As the transporting force of the automatic sheet feeding unit 213 may in general become unstable due to change in quality of the paper used for the original, said distance is preferably as short as possible, and, in practice, a distance of 2–5 mm is acceptable.

The transport roller 202 can be composed of ethylene-propylene rubber, chloroprene rubber or silicone. The original contacting member 203 can be advantageously composed of a flexible member such as a plastic film of polyester, polyethylene, polyethylene terephthalate, polyetheretherketone, nylon or fluorinated resin, or a metal foil such as aluminum foil or titanium foil. The thickness of the original contacting member 203 is preferably 0.1 mm or less, though it is dependent to a certain extent on the material used. Said flexible member 203 is fixed at an end thereof to the support member 206 by means of adhesion or of fixing screws, and contacts at the other end with the reading position 204 of the line sensor 201, by the weight or elasticity of the flexible member itself.

The foregoing embodiments can provide the following advantages:

(1) As the transport roller 202 serves only for the transportation of the original, the rubber portion of said roller can be shortened, whereby it is rendered possible to reduce the influence of flatness of the reading face of the line sensor and to achieve stable original transportation. Also cost reduction can be facilitated as the control of said flatness is made easier;

(2) As the original transporting function and the original contacting function are separated into different members, the pressure required for transporting the original and the pressure required for contacting the original with the line sensor are minimized. Thus the pressure required for deforming the transport roller 202 for absorbing the unevenness on the surface of the line sensor is no longer required. For this reason the load on the motor can be reduced, and it is made possible to reduce the dimension and cost of the motor;

(3) Skewed sheet advancement hardly takes place even if the sheet is supplied in skewed manner.

Figure 8A:
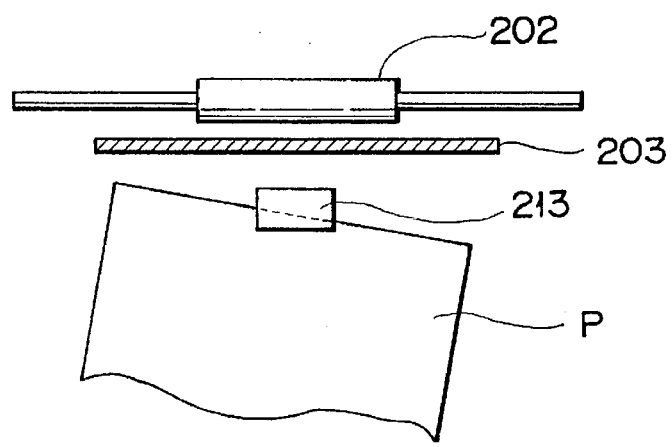
Figure 8B:
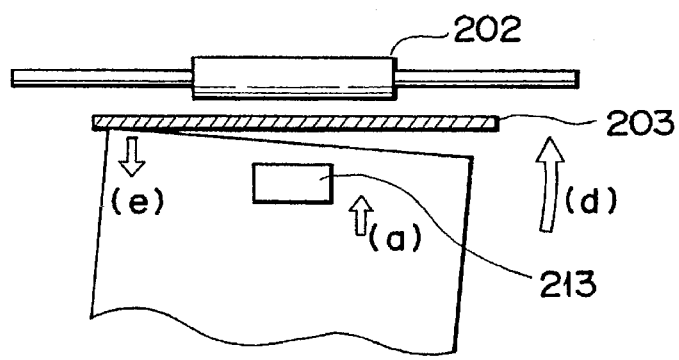
Figure 8C:
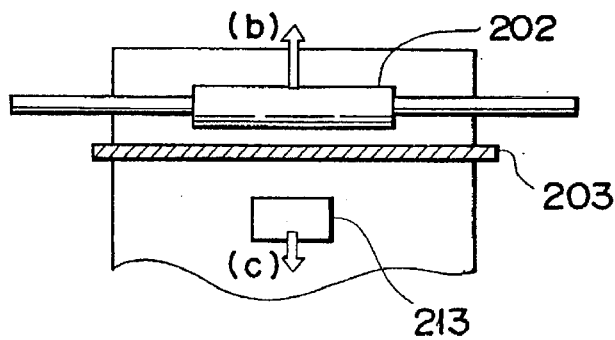

FIGS. 8A to 8C are schematic plan views of embodiments of the present invention, wherein the line sensor, not illustrated in these drawings, is positioned behind the transport roller 202. When the original P is supplied in skewed position as shown in FIG. 8A, the front end of said original P impinges on the original contacting means 203, lacking the transporting function, thereby generating a resistance (e) as indicated by an arrow in FIG. 8B. The automatic feeding unit 213 exerts a feeding force (a) indicated by an arrow, which, in cooperation with said resistance (e), generates a rotating force (d), also indicated by an arrow and serving to correct the position of the original P, whereby the original P is returned to a proper position. When said resistance (e) becomes distributed over the entire front end of the original, said feeding force (a) overcome the resistance (e) and feeds the original into the transport roller 202. Referring to FIG. 8C, since the transport roller 202 is constructed short, there is scarcely generated a rotating force between the load (c) of the automatic feeding unit 213 and the transporting force (b) of the transport roller 202. For this reason, skew-free transportation of the original could be realized. Skewed advancement can could further be prevented by aligning the center of the rubber portion of the transport roller 202, in the main scanning direction, with the center of the automatic original feeding unit 213 and with the center of effective reading length of the unillustrated line sensor;

(4) The original contacting means 203 was made white in at least a part of the reading position, in order to avoid undesirable influence in case of reading an original on thin paper, transparent sheet or with a narrow width. Also there could be provided reference white color in multi-level image reading. More specifically, the output of the line sensor 201 can be electrically corrected for example by memorizing said output by the unit of bits, taking the reflectance of white area of the original contacting means 203 as reference. Said white area may be formed by constituting the original contacting means 203 itself with a white material, or by white printing or painting on a surface, facing the original, of the contacting means 203. Furthermore, a similar effect can be obtained also by such printing or painting on a surface, opposite to said original, of transparent original contacting means 203. [Embodiment 3]

Figure 9:
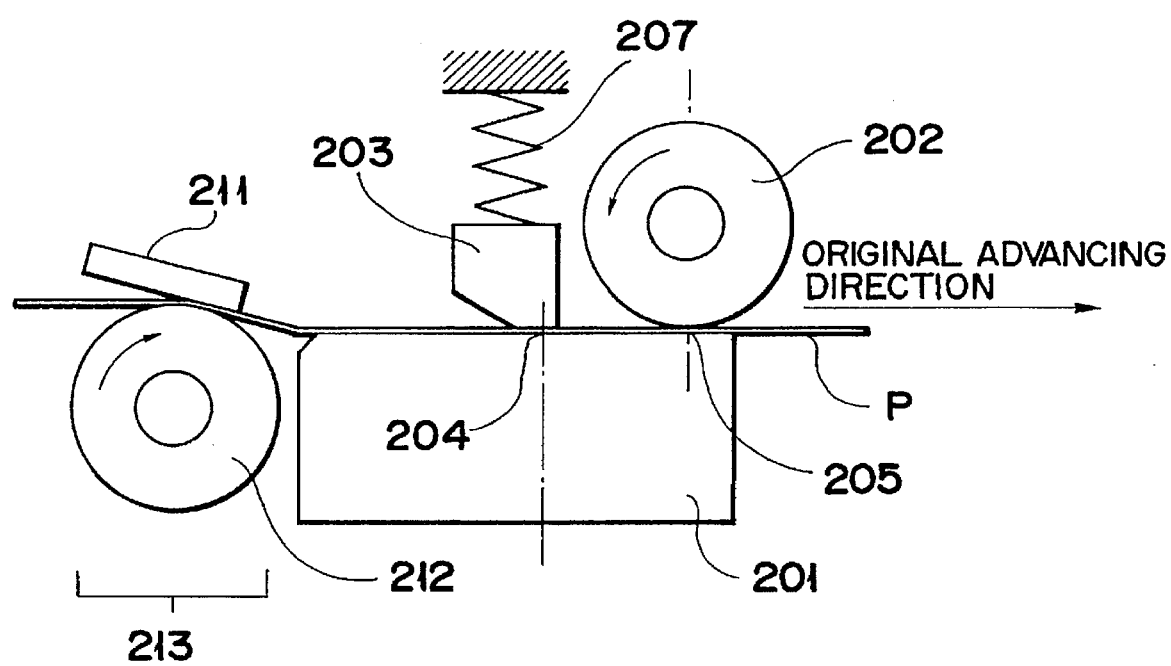

FIG. 9 is a schematic cross-sectional view of a 3rd embodiment of the image reading device of the present invention, wherein original contacting means is composed of an elastic member 203 and a spring 207. The elastic member 203 is composed of rubber or sponge, or a member structurally showing elasticity. The spring 207 serving as the pressing means could be replaced by gravity as in the embodiment 1, with similarly satisfactory results. Also the present embodiment could provide similar effects as those in the embodiment 2.

[Embodiment 4]

Figure 10:
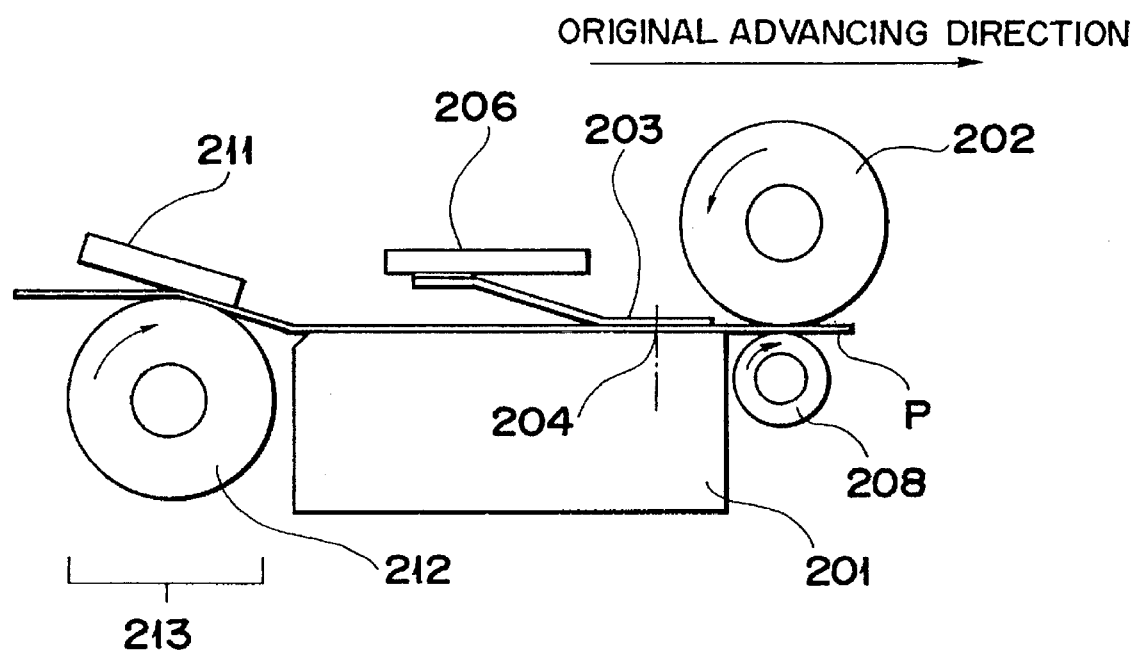

FIG. 10 is a schematic cross-sectional view of a 4th embodiment of the image reading device of the present invention, wherein a transport roller 202 is provided outside a line sensor 201. A backup idler roller 208 is pressed to the transport roller 202 and serves to transport the original P by pinching the same in cooperation with the transport roller 202. The original pressing means employs a flexible member 203 as shown in FIG. 6. Also the present embodiment could provide excellent effects as those in the 2nd embodiment.

[Embodiment 5]

Figure 11:
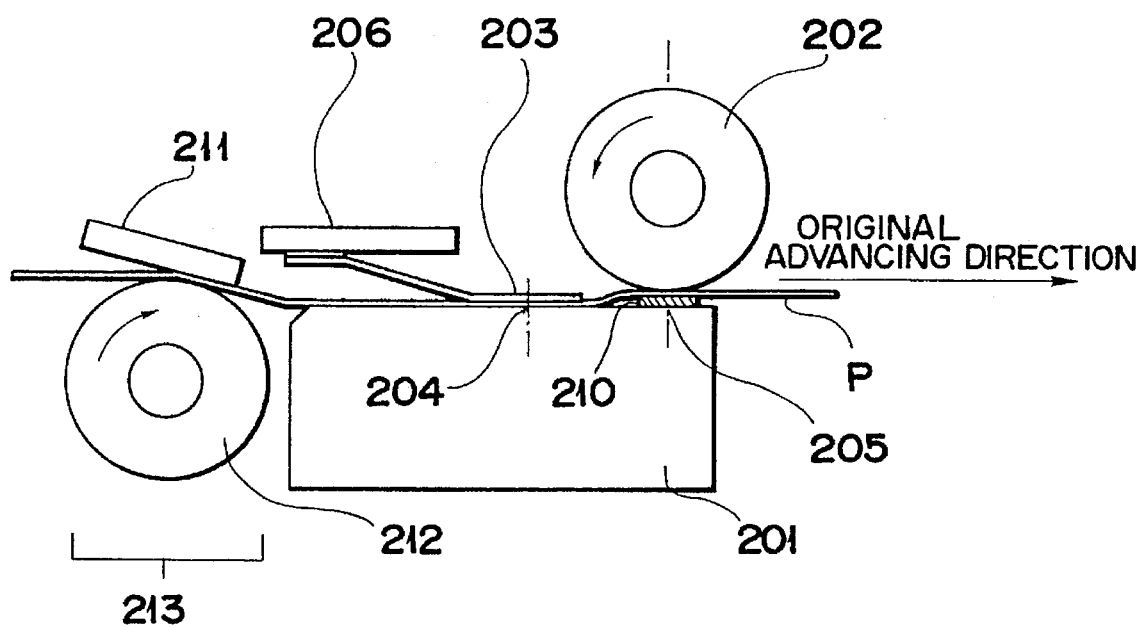
FIG. 11 is a schematic cross-sectional view of a 4th embodiment of the original image reading device of the present invention.

FIG. 11 is a schematic cross-sectional view of a 5th embodiment of the image reading device of the present invention, wherein there is provided, at the contact point 205 of the transport roller 202 in the 2nd embodiment shown in FIG. 6, a member 210 (hereinafter called a sliding member) which has a friction coefficient smaller than that between the reading plane of the line sensor 201 and the transport roller 202. The reading plane of the line sensor 201 is usually composed of glass, and the sliding member 210 is preferably composed of fluorinated resin. The sliding member 210 may be formed by printing, coating or adhesion on the reading plane of the line sensor 201, or may be provided in other parts than the reading plane, such as a casing part of the line sensor 201 as long as it does not hinder the advancement of the original. Thus there could be obtained, in addition to the advantages of the foregoing embodiments, an advantage of driving the transport roller 202 with a light load even in the absence of the original P at the contact point 5 of the transport roller 202, whereby compactization of the motor and reduction of power consumption thereof could be effectively attained.

[Embodiment 6]

Figure 12:
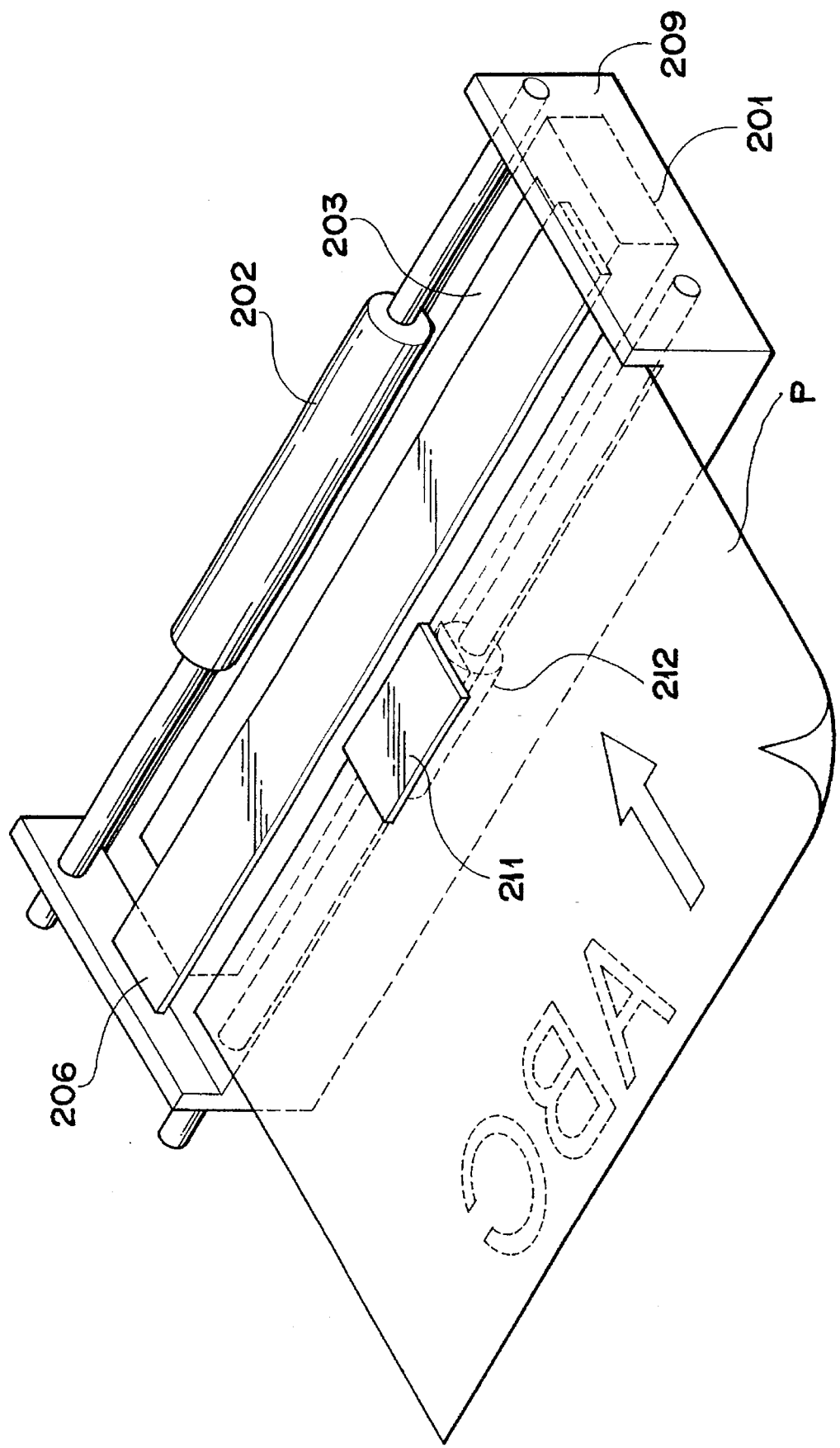
Figure 13:
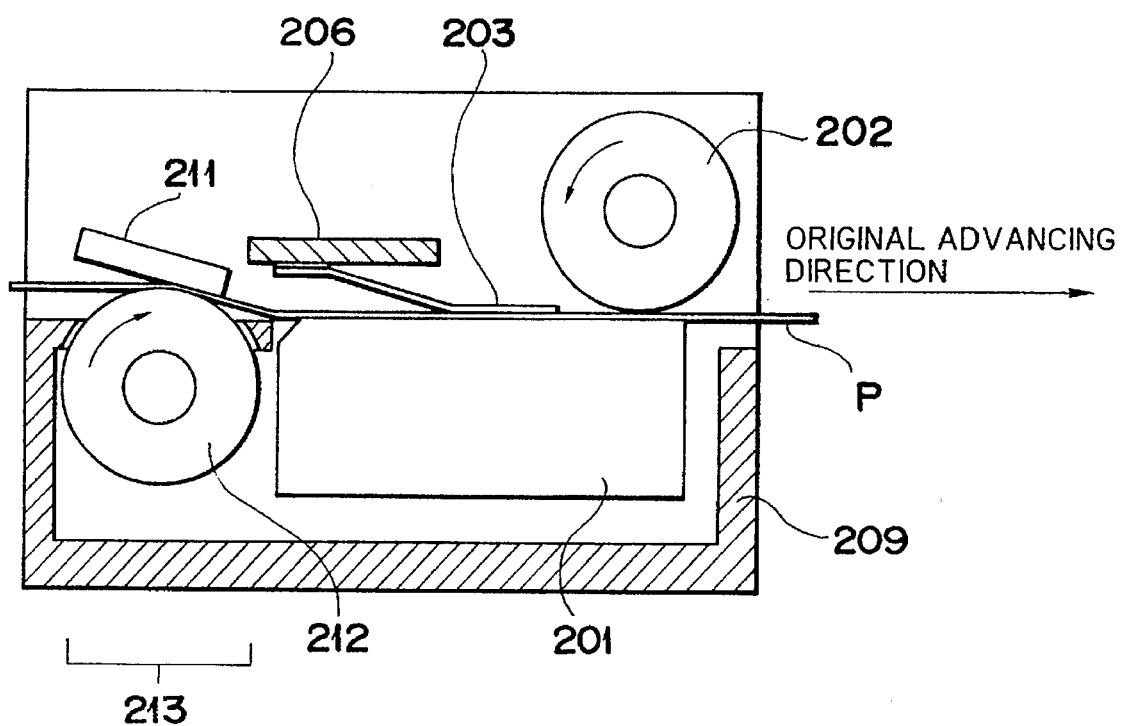

FIGS. 12 and 13 illustrate a 6th embodiment of the image reading device of the present invention, wherein the device shown in FIG. 6 is constructed as an integral unit in a frame. A separating member 211 is supported by an unillustrated member and fixed to a frame 209. Said frame 209 integrally supports a line sensor 201, a separating member 211, a feed roller 212, a transport roller 202 and original contacting means 203.

In this manner the assembly of the information processing apparatus and the detachment of the image reading device, for example in case of malfunction thereof, from the information process apparatus can be replaced even by a person without particular skill and without particular tools.

Also this unit structure allows to reduction of the costs relating to the designing and assembling of the information processing apparatus, thereby enabling provision of such apparatus with a reduced cost.

As described above, the driving power transmission means, even though not shown, of course, may comprise a plurality of gearings and timing belts, or the like.

[Embodiment 7]

Figure 14:
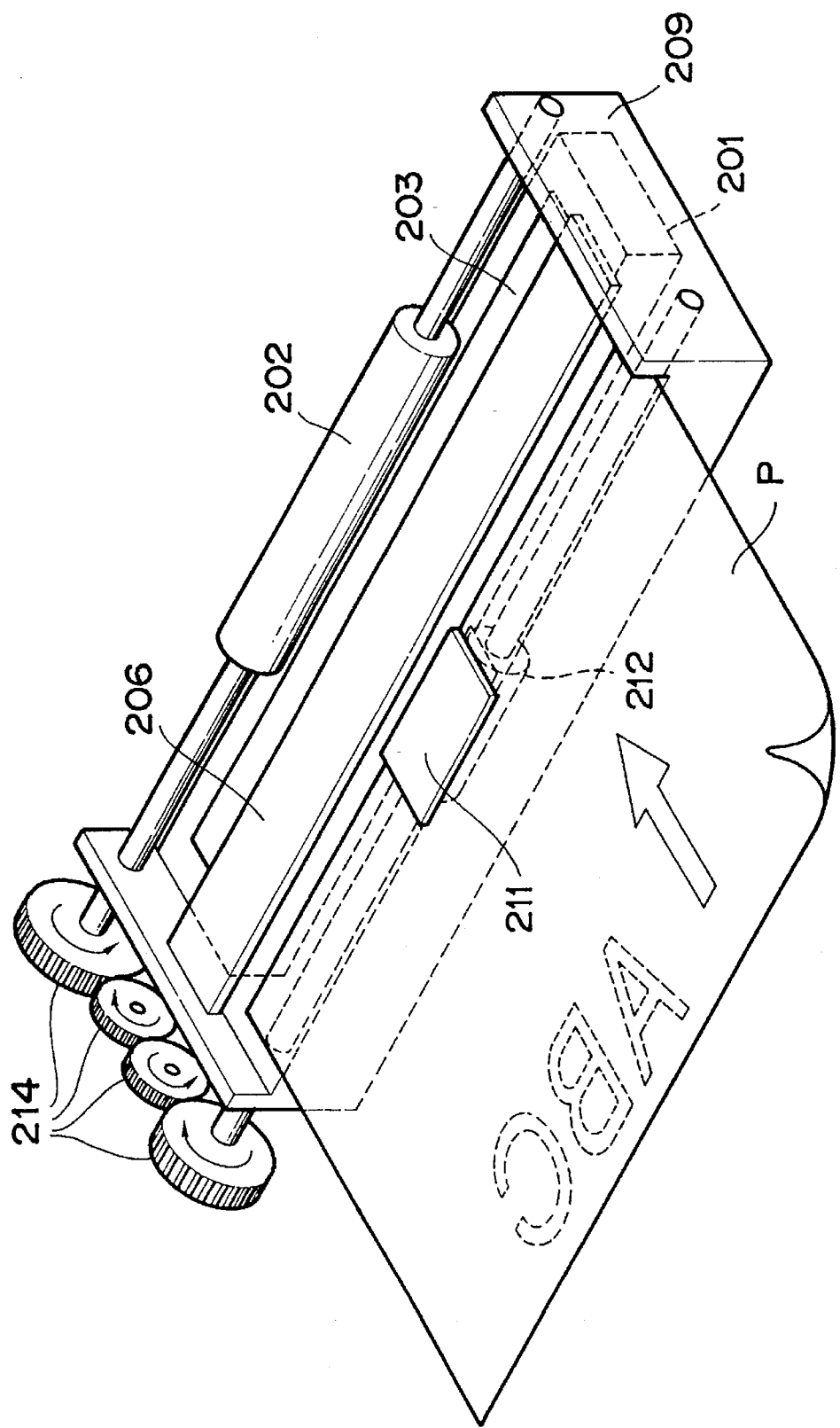

FIG. 14 shows, as another embodiment of the image reading apparatus according to the present invention, an example constituted into an unit by integrally incorporating into a frame an original image reading device as shown in FIG. 6. A separate strip 211 is supported by not shown member, and is secured to a frame 209. The frame 209 has a structure for integrally supporting a line sensor 201, the separating strip 211, a paper supplying roller 212, a transporting roller 202, and an original contacting means 203.

The paper supplying roller 212 and the transporting roller 202 are driven by four gearings 214 serving as a driving power transmission means for transmitting driving power from a driving power source provided within the apparatus body (for example, the whole structure including a transmission means of the facsimile apparatus). Thereby, by means of a single motor, both the paper supplying roller 212 and the transporting roller can be driven.

Figure 15:
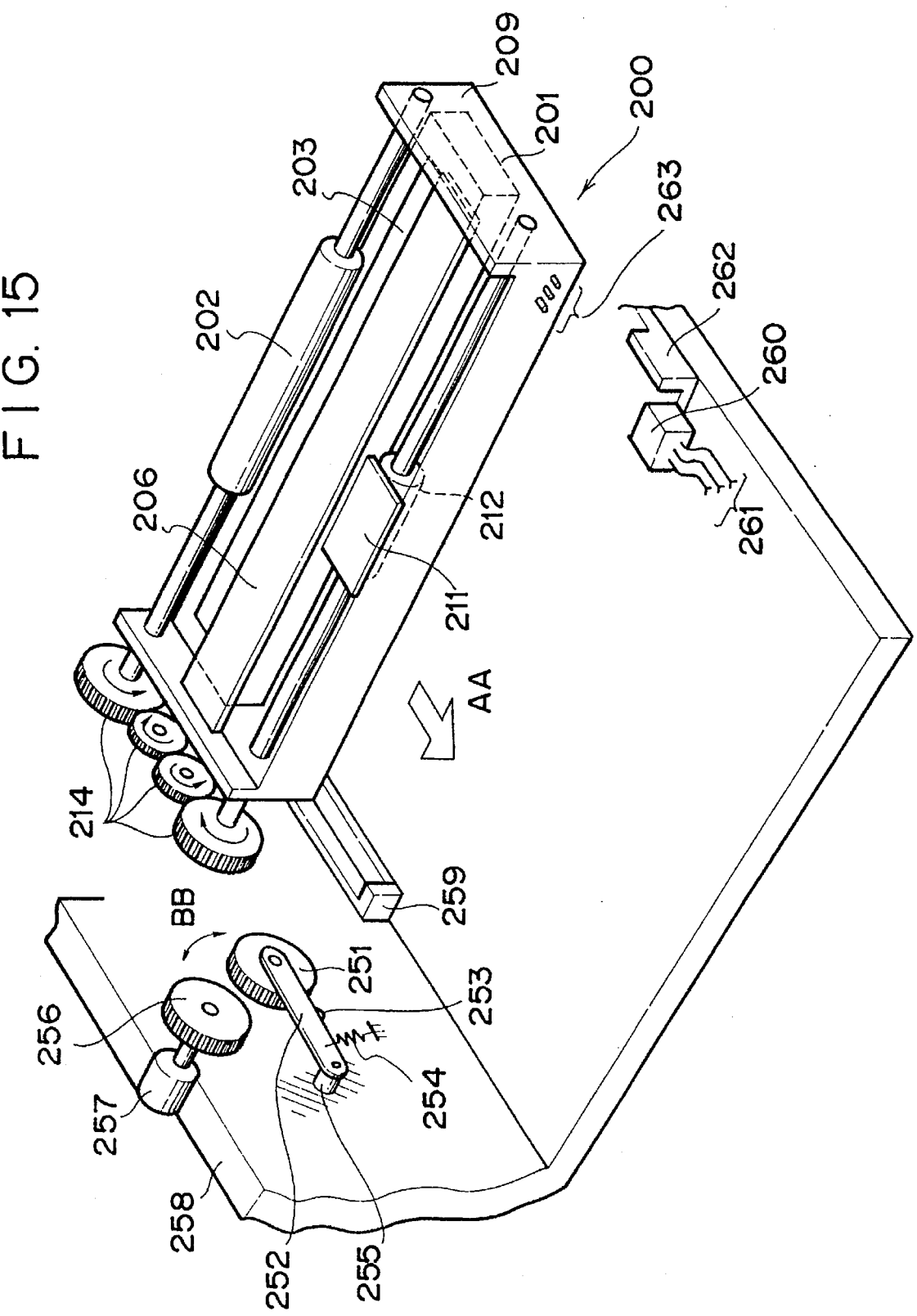

FIG. 15 is a schematic illustrative view showing the combination of the unit shown in FIG. 8 with the apparatus body.

The unit 200 is moved along guides 259 and 262 in parallel with arrow AA. At an end of the longer guide 259, a stopper is provided. At an end of the shorter guide 262, a connector 260 also serving as a stopper is provided. The connector 260 is provided for electrical connection with a signal terminal 263 at a side of the unit 200. The signal terminal 263 includes lines for transmitting a driving signal of the line sensor 201, an image signal from the line sensor 201, a reference signal, and is electrically connected to the apparatus body via a wiring 261 by means of a count with a connector 260, thereby being controllable each other.

At a frame 258 on the apparatus body side to which members 259-262 are secured, a motor 257 is provided as a driving source on a side wall thereof. The motor 257 is provided with a gearing 256, which is engaged with a gearing 251 at the combining unit 200, thereby the driving power is transmitted via the gearing 251 to a gearing 214 at a side of unit. By means of the driving power such transmitted, the rollers 202, and 212 are rotated. The gearing 251 is mounted on an arm 252, is rotatable about an axis 255 fixed on the side wall, and pivotable about 255 in a direction of arrow BB. When the unit 200 is not mounted, the arm 252 is biased downwardly by means of a spring 254. And, at a lower position, a stopper 253 is provided to limit a pivotal movement of the arm 252 (FIG. 15).

Figure 16:
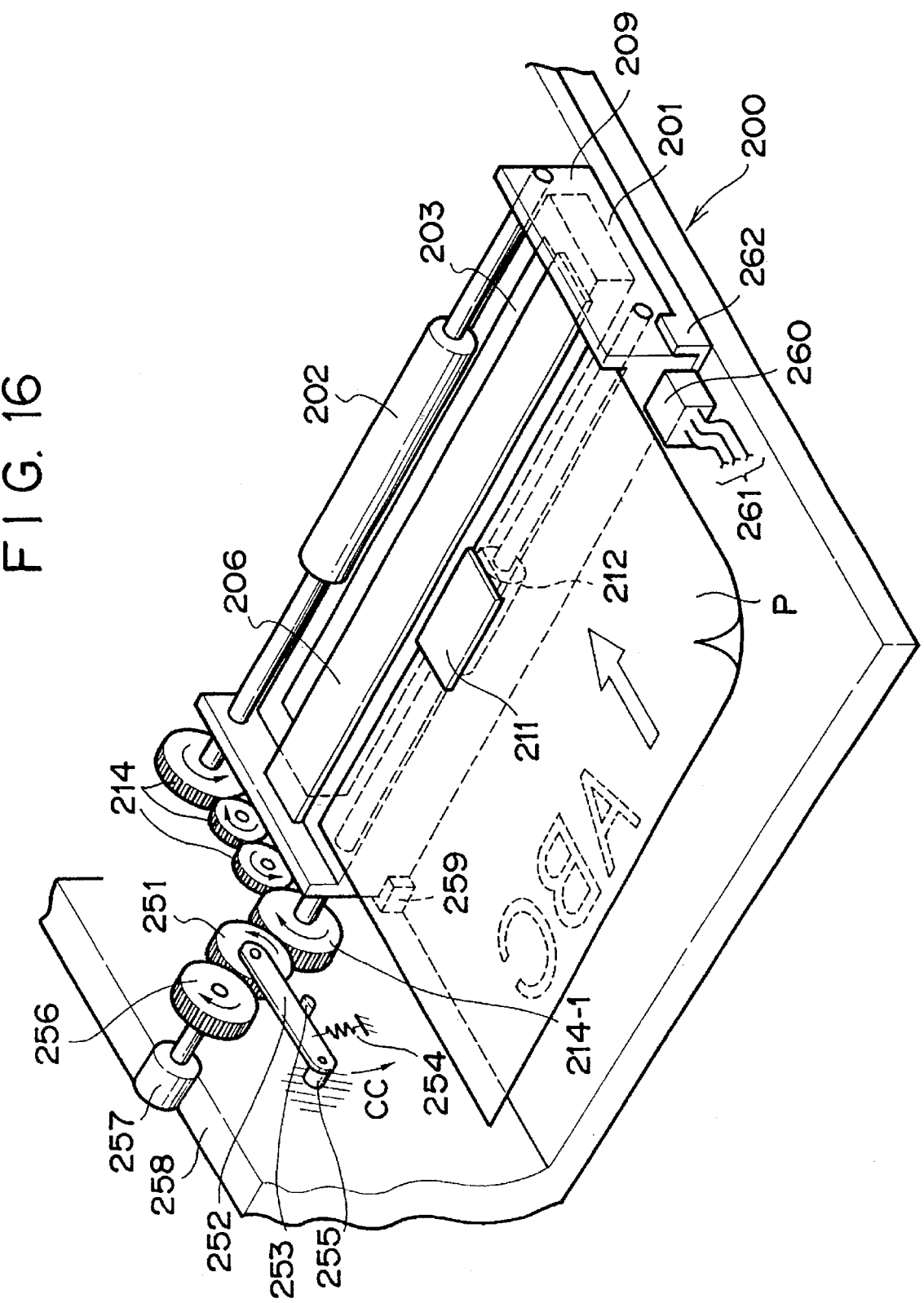

Next, FIG. 16 shows a state wherein the unit 200 is completely combined with the body frame 252.

As the unit moves along the arrow AA (FIG. 15), among transmission gearings 214, the gearing 214-1 provided on an axis of the paper supplying roller 212 is engaged with the gearing 251. By means of the gearing 214-1, the gearing 251 is pushed upwardly against a biasing CC, so as to engage with the gearing 256 of the driving power source.

Further moving the unit 200, simultaneously with limiting movement of the stoppers 259 and 260, the electrical connection through the connector 260 is completed.

At this time, the gearings 214-1, 251, 256 mesh with one another (FIG. 16).

Due to this structure, the image reading apparatus formulated into the unit can be combined and divided readily and securely. Further, since the driving source such as a motor remains at the side of the apparatus, the cost of the unit can be reduced. There is no severe requirement in durability of several members in mounting them on the unit, thereby reducing whole size and weight.

The electrical connection between the unit 200 and the apparatus body is achieved by the signal terminal 263 provided at the unit 200 and the corresponding connector 260 at the apparatus body according to the above described embodiment. However, the terminal and connector may be provided respectively at the body and the unit. Further, it is desirable that, simultaneously with the combining, the electrical connection therebetween is achieved, while the combining of the unit and the electrical connection may also be achieved separately in a two actions. When the motor as a driving source is mounted within an unit, the power source for driving it may supply power via the connector.

The mechanical connection and the electrical connection may be checked by a detection means, and specifically, may be checked by either or both detecting pivotal position of the arms 252 by means of micro switch or the like, and by an electric signal communication via the electrical connecting section. Of course, it is possible to check the connection at another section by means of the micro switch or the electrical detection.

[Embodiment 8]

Figure 17:
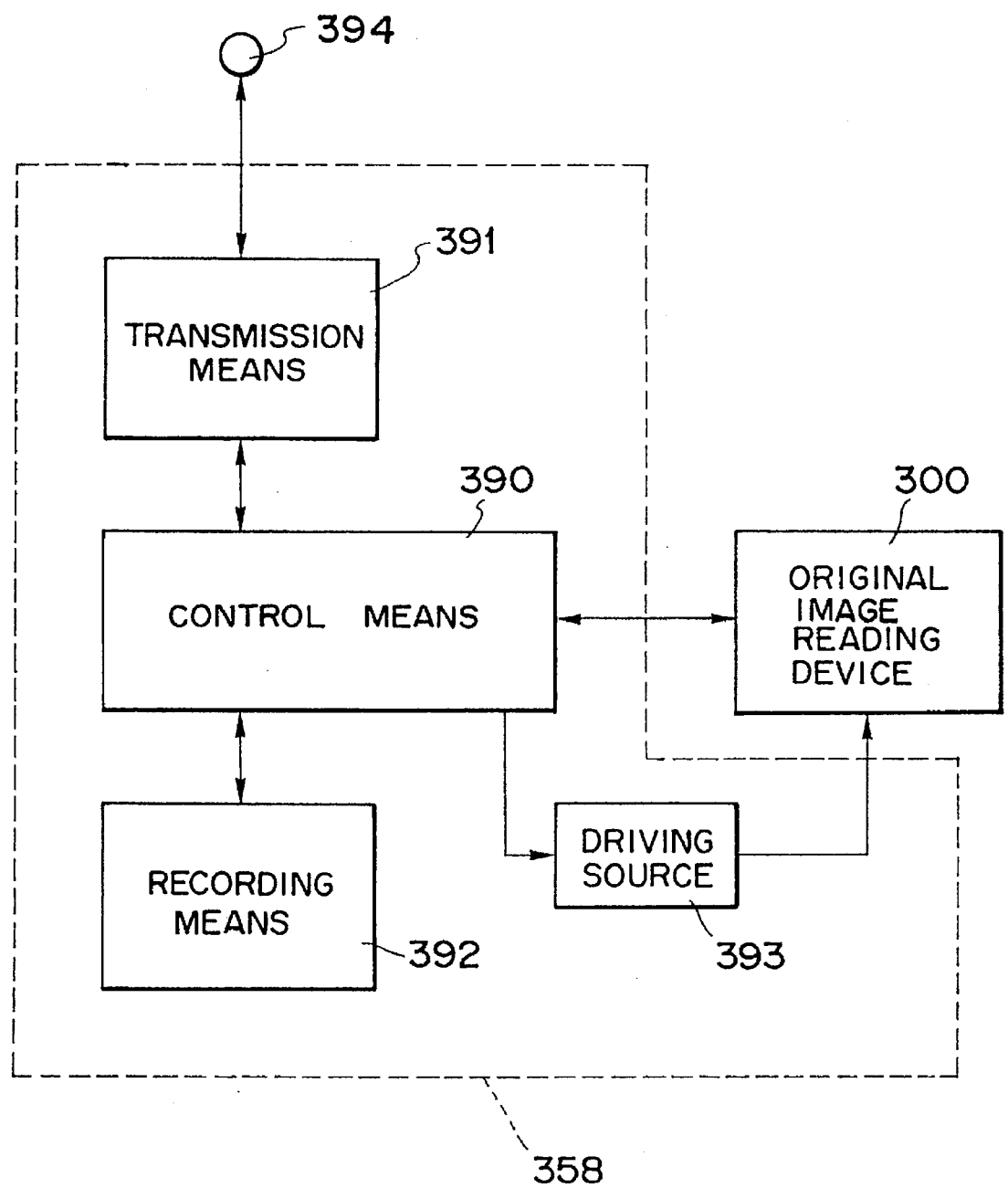
FIG. 17 is a schematic block diagram explaining an example of a facsimile apparatus in which the image reading device of the present invention can be used.

FIG. 17 shows, as a schematic block diagram, an example of a facsimile apparatus having an image reading apparatus according to the present invention.

Upon inserting an original P into an original image reading apparatus 300, and upon starting transmitting operations, by means of an driving source 393, an apparatus 300 rotates a transporting roller to transport an original, and reads image information by means of a line sensor. The information is stored in a memory of a control means 90 as an electric signal.

Further, upon connecting with an external circuit 394 connected via the transmitting means to an end to be transmitted, the image signal within the memory is transmitted via the transmission means.

While, in the above embodiments, several types of the image reading apparatus are shown for use in the facsimile transmission, in each case, secure information transmission can be obtained.

Further, a recording means 392 records on a recording medium the image information transmitted. As such recording means, a thermal head, an ink jet recording head or the like may be used.

[Advantage of the Invention]

As explained in the foregoing, the present invention is featured by the use of pressure means consisting of a flexible sheet for maintaining the original document in close contact, without lifting or movement, with the reading portion of reading means, whereby the pressure means can be constructed in a flatter configuration and the total height of the apparatus can therefore be reduced.

Also since the pressure means is flat, there is not required a high precision of assembly in order to guide the reflected light to the reading portion, in comparison with the case of conventional pressure means with a curved surface.

Also a member flexible in the pressing direction is inserted between the weight and the flexible sheet constituting the pressure means to improve the contact, so that the image reading device of the present invention can be used for a contact image sensor of a limited depth of focus.

Furthermore the pressure means itself is made free of the transporting function, so that the selection of material therefor is made easier in comparison with the case of conventional pressure roller.

Furthermore, the image reading device of the present invention is capable of resolving the skewed advancement, elevated cost and large motor dimension, thereby attaining reductions in the dimension, weight and cost which are desired particularly in recent years. Furthermore, a unit structure integrally containing the components in a frame allows to improve the precision of assembly of the components relating to the original image reading. In addition, said unit can be standardized and incorporated in various models of the image information processing apparatus to significantly reduce the work involved in the designing, evaluation and manufacture, thereby achieving a total cost reduction of such apparatus.

Furthermore, as said image reading device can be realized in a compact and light-weight unit, the layout in the image information processing apparatus is facilitated and the freedom of design is widened.

Furthermore, in case of a defect or a malfunction of the image reading device incorporated in the image information processing apparatus, the trouble can be repaired by simple replacement of the unit by the operator without particular training, skill or tools.

As explained in the foregoing, the present invention provides a compact, light-weight and inexpensive image reading device, which is adapted for use in various image processing apparatus, such as a facsimile, an image sensor, a computer, a word processor, a copying machine or the like.

The present invention is not limited to the foregoing embodiments but is subject to various modifications within the scope and spirit of the appended claims.

What is claimed is:

1. An image reading device including reading means for reading image information of an original, comprising:
   a conveying roller for conveying an original in a downstream direction, comprising a conveying section narrower than a reading width of said reading means; and
   original pressing means comprising a flexible sheet located at a position relative to said reading means upstream of an original conveying location of said conveying roller, a flexible member for pressing said flexible sheet, and means for pressing said flexible member.

2. A device according to claim 1, wherein said means for pressing the flexible member comprises a weight member.

3. A device according to claim 1, wherein said means for pressing the flexible member comprises a spring.

4. A device according to claim 1, wherein said means for pressing the flexible member comprises a rubber sponge.

5. A device according to claim 1, wherein said flexible member comprises a flexible sheet.

6. A device according to claim 1, wherein said flexible member is substantially flat.

7. A device according to claim 1, wherein said flexible member is composed of organic resin.

8. A device according to claim 1, wherein at least a part of said flexible member is white.

9. A device according to claim 1, wherein
   said flexible sheet is arranged at a position corresponding to a position at which said reading means reads the original.

10. A device according to claim 1, wherein the original is conveyed in contact with a portion of a reading surface of said reading means, and the original is read at the reading surface.

11. A device according to claim 1, wherein said reading means is a contact type reader.

12. An information processing apparatus comprising:
    an image reading device comprising reading means, a conveying roller for conveying an original in a downstream direction, said conveying roller being narrower than a reading width of said reading means, and original pressing means comprising a flexible sheet located at a position upstream of an original conveying location of said conveying roller, relative to said reading means, a flexible member for pressing said flexible sheet, and means for pressing said flexible member;

an original stacking unit for supporting the original to be transported to said image reading device; and an operation panel.

13. An apparatus according to claim 12, further comprising a recording unit comprising recording means.

14. An apparatus according to claim 13, wherein said recording unit comprises recording means and a cutter for cutting a recording material.

15. An apparatus according to claim 13, wherein said recording means comprises a thermal head.

16. An apparatus according to claim 13, wherein said recording means comprises an ink jet recording head.

17. An apparatus according to claim 16, wherein said ink jet recording head is based on a method of discharging ink utilizing thermal energy.

18. A device according to claim 12, wherein said flexible sheet is arranged at a position corresponding to a position at which said reading means reads the original.

19. A device according to claim 12, wherein the original is conveyed in contact with a portion of a reading surface of said reading means, and the original is read at the reading surface.

20. A device according to claim 12, wherein said reading means is a contact type reader.

21. An image reading device for conveying an original in substantial contact with reading means comprising light receiving means constituting a reading region, said light receiving means being disposed at least over a width of the original, illuminating said original with a light source and introducing the light reflected by said original into said reading means thereby reading image information, comprising a stationary reading portion of said reading means positioned outside of the nip of an original conveying roller and at the side of feeding of the original, and original contacting means provided at said reading portion, wherein the original conveying roller has a width more narrow than a width of said reading portion.

22. A device according to claim 21, wherein said original contacting means comprises of a film-shaped flexible member.

23. A device according to claim 21, wherein said original contacting means comprises of an elastic member which is elastically pressed toward said reading means.

24. A device according to claim 21, wherein said original conveying roller is maintained in contact with a reading plane of said reading means.

25. A device according to claim 24, wherein an automatic original feeding device, said reading position and said conveying roller are positioned in order in the original transporting direction, from the feed side to the discharge side.

26. A device according to claim 25, wherein a line connecting the center of a feed roller of said automatic feeding device, in a direction perpendicular to the direction transporting direction, and the center of said original conveying roller, in a direction perpendicular to the original transporting direction, passes through the center of an effective reading length of said reading means in the main scanning direction thereof.

27. A device according to claim 21, wherein at least a part of said original contacting means is white.

28. A device according to claim 24, wherein a sliding member of a friction coefficient smaller than a friction coefficient between said original conveying roller and the reading plane of the reading means is provided in a position contacted by said original conveying roller.

29. A device according to claim 21, wherein at least an automatic original feeding unit, said reading means, said original conveying roller and said original contacting means are integrally provided in a frame to constitute a unit structure.

30. A device according to claim 21, wherein the distance between said original conveying roller and said original contacting means is in a range of 2 to 5 mm.

31. A device according to claim 29, further comprising at least one of an electric terminal and a connector.

32. A device according to claim 21, wherein said reading portion comprises an array of reading elements and said array is aligned substantially parallel to an axis of the original conveying roller.

33. An information processing apparatus comprising:

an image reading device comprising:

a light source for illuminating an original; and reading means comprising light receiving means constituting a reading region, said light receiving means being disposed at least over a width of the original for receiving the light reflected by said original thereby reading image information;

wherein a stationary reading portion of said reading means is positioned outside the nip of an original conveying roller and at the side of feeding of said original, original contacting means is provided at said reading portion, and the original conveying roller has a width more narrow than a width of said reading portion;

an original stacker unit for supporting the originals to be transported to said image reading device; and an operation panel.

34. An apparatus according to claim 33, further comprising a recording unit comprising recording means.

35. An apparatus according to claim 34, wherein said recording unit comprises recording means and a cutter for cutting a recording material.

36. An apparatus according to claim 34, wherein said recording means comprises a thermal head.

37. An apparatus according to claim 34, wherein said recording means comprises an ink jet recording head.

38. An apparatus according to claim 37, wherein said ink jet recording head is based on a method for discharging ink utilizing thermal energy.

39. An apparatus according to claim 33, further comprising at least one of an electric terminal or a connector for electrically connecting said image reading device with a main portion of said information processing apparatus.

40. An apparatus according to claim 33, further comprising a detection means for detecting a mounting of said image reading device.

41. An apparatus according to claim 33, wherein said image reading device has drive transmission means for transmitting a driving power for driving said conveying roller from said information processing apparatus.

42. An apparatus according to claim 33, wherein said light receiving means comprises an array of light receiving elements and said array is aligned substantially parallel to an axis of the original conveying roller.

43. An image reading apparatus, wherein a light illuminates an original closely contacted to a reading section of an image reading means comprising stationary light receiving means constituting a reading region, said light receiving means being disposed at least over a width of the original, and the light reflected by said original and incident on said reading section is used to read an image on the original, said reading section being arranged at an original supplying side and outside a nip of an original conveying roller, comprising:

original contacting means for contacting the original against said reading section; and driving power transmission means for transmitting from an external portion of said apparatus, a driving power for driving said original conveying roller, wherein the original conveying roller has a width more narrow than a width of said receiving means.

44. An apparatus according to claim 43, wherein said original contacting means comprises a flexible member having a film configuration.

45. An apparatus according to claim 43, wherein said original contacting means comprises a flexible member flexibly pressed against said image reading means.

46. An apparatus according to claim 43, wherein said original conveying roller contacts the same surface as the reading section of said image reading means.

47. An apparatus according to claim 46, wherein, from the paper supplying side toward the paper ejecting side, an automatic paper supplying device, said reading section, and said conveying roller are provided in order.

48. An apparatus according to claim 47, wherein a straight line connecting a central point of the paper supplying roller of said automatic paper supplying device with regard to a direction perpendicular to the original transporting direction, with a central point of said original conveying roller with regard to a direction perpendicular to the original transporting direction passes through a central point of an effective original reading length in a main scanning direction of said image reading means.

49. An image reading apparatus according to claim 43, wherein at least a portion of said original contacting means is white.

50. An image reading apparatus according to claim 46, further comprising a slipping member with a frictional coefficient smaller than a frictional coefficient between the reading surface and the original conveying roller.

51. An image reading apparatus according to claim 43, wherein at least an automatic paper supplying means, said image reading means, said original conveying roller, and said original contacting means are arranged within a frame as a unit.

52. An image reading apparatus according to claim 51, further comprising at least one of an electrical terminal and a connector.

53. An image reading apparatus according to claim 43, wherein a distance between said original conveying roller and said original contacting means is 2–5 mm.

54. An apparatus according to claim 43, wherein said light receiving means comprises an array of light receiving elements and said array is aligned substantially parallel to an axis of the original conveying roller.

55. An image reading device for maintaining an original in at least substantial contact with reading means, illuminating said original with a light source and introducing the light reflected by said original into said reading means thereby reading image information, comprising a reading portion of said reading means positioned outside of the nip of an original conveying roller and at the side of feeding of the original, and original contacting means provided at said reading portion, wherein the original conveying roller has a width more narrow than a width of the reading means, and wherein said original contacting means comprises a film-shaped flexible member.

56. A device according to claim 55, wherein the reading means has a reading region extending at least over a width of the original.

57. An image reading device for maintaining an original in at least substantial contact with reading means, illuminating said original with a light source and introducing the light reflected by said original into said reading means thereby reading image information, comprising a reading portion of said reading means positioned outside of the nip of an original conveying roller and at the side of feeding of the original, and original contacting means provided at said reading portion, wherein the original conveying roller has a width more narrow than a width of the reading means, and wherein said original contacting means comprises an elastic member which is elastically pressed toward said reading means.

58. A device according to claim 57, wherein the reading means has a reading region extending at least over a width of the original.

59. An image reading device for maintaining an original in at least substantial contact with reading means, illuminating said original with a light source and introducing the light reflected by said original into said reading means thereby reading image information, comprising a reading portion of said reading means positioned outside of the nip of an original conveying roller and at the side of feeding of the original, and original contacting means provided at said reading portion, wherein the original conveying roller has a width more narrow than a width of the reading means, and wherein said original conveying roller is maintained in contact with a reading plane of said reading means.

60. A device according to claim 59, wherein the reading means has a reading region extending at least over a width of the original.

61. A device according to claim 59, wherein an automatic original feeding device, said reading position and said conveying roller are positioned in order in the original transporting direction, from the feed side to the discharge side.

62. A device according to claim 61, wherein a line connecting the center of a feed roller of said automatic feeding device, in a direction perpendicular to the original transporting direction, and the center of said original conveying roller, in a direction perpendicular to the original transporting direction, passes through the center of an effective reading length of said reading means in the main scanning direction thereof.

63. A device according to claim 59, wherein a sliding member of a friction coefficient smaller than a friction coefficient between said original conveying roller and the reading plane of the reading means is provided in a position contacted by said original conveying roller.

64. An image reading device for maintaining an original in at least substantial contact with reading means, illuminating said original with a light source and introducing the light reflected by said original into said reading means thereby reading image information, comprising a reading portion of said reading means positioned outside of the nip of an original conveying roller and at the side of feeding of the original, and original contacting means provided at said reading portion, wherein the original conveying roller has a width more narrow than a width of the reading means, and wherein at least a part of said original contacting means is made white.

65. A device according to claim 64, wherein the reading means has a reading region extending at least over a width of the original.

66. An image reading device for maintaining an original in at least substantial contact with reading means, illuminating said original with a light source and introducing the light reflected by said original into said reading means thereby reading image information, comprising a reading portion of said reading means positioned outside of the nip of an original conveying roller and at the side of feeding of the original, and original contacting means provided at said reading portion, wherein the original conveying roller has a width more narrow than a width of the reading means, and wherein at least an automatic original feeding unit, said reading means, said original conveying roller and said original contacting means are integrally provided in a frame to constitute a unit structure.

67. A device according to claim 66, wherein the reading means has a reading region extending at least over a width of the original.

68. A device according to claim 66, further comprising at least one of an electric terminal and a connector.

69. An image reading device for maintaining an original in at least substantial contact with reading means, illuminating said original with a light source and introducing the light reflected by said original into said reading means thereby reading image information, comprising a reading portion of said reading means positioned outside of the nip of an original conveying roller and at the side of feeding of the original, and original contacting means provided at said reading portion, wherein the original conveying roller has a width more narrow than a width of the reading means, and wherein the distance between said original conveying roller and said original contacting means is in a range of 2 to 5 mm.

70. A device according to claim 69, wherein the reading means has a reading region extending at least over a width of the original.

71. An information processing apparatus comprising:
   an image reading device comprising:
      a light source for illuminating an original; and
      reading means for receiving the light reflected by said original thereby reading image information;
      wherein a reading portion of said reading means is positioned outside the nip of an original conveying roller and at the side of feeding of said original, original contacting means is provided at said reading portion, and the original conveying roller has a width more narrow than a width of said reading means;
   an original stacker unit for supporting the originals to be transported to said image reading device;
   an operation panel; and
   a recording unit comprising recording means.

72. An apparatus according to claim 71, wherein the reading means has a reading region extending at least over a width of the original.

73. An apparatus according to claim 71, wherein said recording unit further comprises a cutter for cutting a recording material.

74. An apparatus according to claim 71 wherein said recording means comprises a thermal head.

75. An apparatus according to claim 71, wherein said recording means comprises an ink jet recording head.

76. An apparatus according to claim 75, wherein said ink jet recording head discharges ink utilizing thermal energy.

77. An information processing apparatus comprising:
   an image reading device comprising:
      a light source for illuminating an original; and
      reading means for receiving the light reflected by said original thereby reading image information;
      wherein a reading portion of said reading means is positioned outside the nip of an original conveying roller and at the side of feeding of said original, original contacting means is provided at said reading portion, and the original conveying roller has a width more narrow than a width of said reading means;
   an original stacker unit for supporting the originals to be transported to said image reading device;
   an operation panel; and
   at least one of an electric terminal and a connector for electrically connecting said image reading device with a main portion of said information processing apparatus.

78. An apparatus according to claim 77, wherein the reading means has a reading region extending at least over a width of the original.

79. An information processing apparatus comprising:
   an image reading device comprising:
      a light source for illuminating an original; and
      reading means for receiving the light reflected by said original thereby reading image information;
      wherein a reading portion of said reading means is positioned outside the nip of an original conveying roller and at the side of feeding of said original, original contacting means is provided at said reading portion, and the original conveying roller has a width more narrow than a width of said reading means;
   an original stacker unit for supporting the originals to be transported to said image reading device;
   an operation panel; and
   detection means for detecting a mounting of said image reading device.

80. An apparatus according to claim 79, wherein the reading means has a reading region extending at least over a width of the original.

81. An information processing apparatus comprising:
   an image reading device comprising:
      a light source for illuminating an original; and
      reading means for receiving the light reflected by said original thereby reading image information;
      wherein a reading portion of said reading means is positioned outside the nip of an original conveying roller and at the side of feeding of said original, original contacting means is provided at said reading portion, and the original conveying roller has a width more narrow than a width of said reading means;
   an original stacker unit for supporting the originals to be transported to said image reading device; and
   an operation panel, wherein said image reading device comprises drive transmission means for transmitting a driving power for driving said conveying roller from said information processing apparatus.

82. An apparatus according to claim 81, wherein the reading means has a reading region extending at least over a width of the original.

83. An image reading apparatus, wherein a light illuminates an original closely contacted to a reading section of an image reading means, and the light reflected by said original and incident on said reading section is used to read an image on the original, said reading section being arranged at an original supplying side and outside a nip of an original conveying roller, comprising:
   original contacting means for contacting the original against said reading section; and
   driving power transmission means for transmitting from an external portion of said apparatus, a driving power for driving said original conveying roller, wherein the original conveying roller has a width more narrow than a width of said reading means, and wherein said original contacting means comprises a flexible member having a film configuration.

84. An apparatus according to claim 83, wherein the reading means has a reading region extending at least over a width of the original.

85. An image reading apparatus, wherein a light illuminates an original closely contacted to a reading section of an image reading means, and the light reflected by said original and incident on said reading section is used to read an image on the original, said reading section being arranged at an original supplying side and outside a nip of an original conveying roller, comprising:

original contacting means for contacting the original against said reading section; and driving power transmission means for transmitting from an external portion of said apparatus, a driving power for driving said original conveying roller, wherein the original conveying roller has a width more narrow than a width of said reading means, and wherein said original contacting means comprises a flexible member flexibly pressed against said image reading means.

86. An apparatus according to claim 85, wherein the reading means has a reading region extending at least over a width of the original.

87. An image reading apparatus, wherein a light illuminates an original closely contacted to a reading section of an image reading means, and the light reflected by said original and incident on said reading section is used to read an image on the original, said reading section being arranged at an original supplying side and outside a nip of an original conveying roller, comprising:

original contacting means for contacting the original against said reading section; and driving power transmission means for transmitting from an external portion of said apparatus, a driving power for driving said original conveying roller, wherein the original conveying roller has a width more narrow than a width of said reading means, and wherein said original conveying roller contacts the same surface as the reading section of said image reading means.

88. An apparatus according to claim 87, wherein the reading means has a reading region extending at least over a width of the original.

89. An apparatus according to claim 87, wherein, from the paper supplying side toward the paper ejecting side, an automatic paper supplying device, said reading section, and said conveying roller are provided in order.

90. An apparatus according to claim 89, wherein a straight line connecting a central point of the paper supplying roller of said automatic paper supplying device with regard to a direction perpendicular to the original transporting direction, with a central point of said original transporting roller with regard to a direction perpendicular to the original conveying direction passes through a central point of an effective original reading length in a main scanning direction of said image reading means.

91. An image reading apparatus according to claim 87, further comprising a slipping member with a frictional coefficient smaller than a frictional coefficient between the reading surface and the original conveying roller.

92. An image reading apparatus, wherein a light illuminates an original closely contacted to a reading section of an image reading means, and the light reflected by said original and incident on said reading section is used to read an image on the original, said reading section being arranged at an original supplying side and outside a nip of an original conveying roller, comprising:

original contacting means for contacting the original against said reading section; and driving power transmission means for transmitting from an external portion of said apparatus, a driving power for driving said original conveying roller, wherein the original conveying roller has a width more narrow than a width of said reading means, and wherein at least a portion of said original contacting means is white.

93. An apparatus according to claim 92, wherein the reading means has a reading region extending at least over a width of the original.

94. An image reading apparatus, wherein a light illuminates an original closely contacted to a reading section of an image reading means, and the light reflected by said original and incident on said reading section is used to read an image on the original, said reading section being arranged at an original supplying side and outside a nip of an original conveying roller, comprising:

original contacting means for contacting the original against said reading section; and driving power transmission means for transmitting from an external portion of said apparatus, a driving power for driving said original conveying roller, wherein the original conveying roller has a width more narrow than a width of said reading means, and wherein at least an automatic paper supplying means, said image reading means, said original conveying roller, and said original contacting means are arranged within a frame as a unit.

95. An apparatus according to claim 94, wherein the reading means has a reading region extending at least over a width of the original.

96. An image reading apparatus according to claim 94, further comprising at least one of an electrical terminal and a connector.

97. An image reading apparatus, wherein a light illuminates an original closely contacted to a reading section of an image reading means, and the light reflected by said original and incident on said reading section is used to read an image on the original, said reading section being arranged at an original supplying side and outside a nip of an original conveying roller, comprising:

original contacting means for contacting the original against said reading section; and driving power transmission means for transmitting from an external portion of said apparatus, a driving power for driving said original conveying roller, wherein the original conveying roller has a width more narrow than a width of said reading means, and wherein a distance between said original conveying roller and said original contacting means is 2–5 mm.

98. An apparatus according to claim 97, wherein the reading means has a reading region extending at least over a width of the original.

* * * * *

UNITED STATES PATENT AND TRADEMARK OFFICE
CERTIFICATE OF CORRECTION

PATENT NO. : 5,661,571
DATED : August 26, 1997
INVENTOR(S) : Kazuya IJUIN, et al.

It is certified that error appears in the above-identified patent and that said Letters Patent is hereby corrected as shown below:

ON THE COVER PAGE

AT [63] Related U.S. Application Data:

"Ser. No. 188,106, Oct. 28, 1994," should read --Ser. No. 188,106, Jan. 28, 1994,--.

AT [56] References cited - U.S. PATENT DOCUMENTS:

"5,013,322  5/1991  Beck et al." should read --5,103,322  4/1992  Beck et al.--.

AT [56] References cited - FOREIGN PATENT DOCUMENTS:

"1305656  12/1989  Japan" should read --1-305656  12/1989  Japan--.

UNITED STATES PATENT AND TRADEMARK OFFICE
CERTIFICATE OF CORRECTION

PATENT NO. : 5,661,571
DATED : August 26, 1997
INVENTOR(S) : Kazuya IJUIN, et al.

It is certified that error appears in the above-identified patent and that said Letters Patent is hereby corrected as shown below:

IN THE DISCLOSURE

COLUMN 1:

Line 21, "apparatus," should read --apparatuses,--.

COLUMN 3:

Line 39, "for" should read --of, for--;

Line 40, "dimension," should read --dimensions,--.

COLUMN 9:

Line 66, "to" should be deleted.

COLUMN 10:

Line 36, "count" should read --contact--.

UNITED STATES PATENT AND TRADEMARK OFFICE
CERTIFICATE OF CORRECTION

PATENT NO. : 5,661,571

DATED : August 26, 1997

INVENTOR(S) : Kazuya IJUIN, et al.

It is certified that error appears in the above-identified patent and that said Letters Patent is hereby corrected as shown below:

COLUMN 13:

Line 41, "of" should be deleted;

Line 55, "direction" (second occurrence) should read --original--.

COLUMN 14:

Line 44, "or" should read --and--.

Signed and Sealed this

Seventh Day of July, 1998

*Attest:*

*Attesting Officer*

BRUCE LEHMAN

*Commissioner of Patents and Trademarks*